United States Patent [19]

Cho et al.

[11] Patent Number: 5,670,041
[45] Date of Patent: Sep. 23, 1997

[54] REDUCED CORROSION ELECTRONIC DESCALING TECHNOLOGY

[75] Inventors: Young I. Cho, Cherry Hill, N.J.; Karl M. Kyriss, West Chester, Pa.

[73] Assignees: Electronic De-Scaling 2000,Inc., Boothwyn; Drexel University, Philadelphia, both of Pa.

[21] Appl. No.: 544,026

[22] Filed: Oct. 17, 1995

[51] Int. Cl.$^6$ .................................................. C02F 1/48
[52] U.S. Cl. .................. 210/222; 204/664; 205/705; 205/710; 205/711; 205/712; 138/DIG. 6
[58] Field of Search .................. 204/664; 205/705, 205/711, 710, 712; 138/DIG. 6; 210/222

[56] References Cited

U.S. PATENT DOCUMENTS

| | | | |
|---|---|---|---|
| 2,596,743 | 5/1952 | Vermeiren | 210/1.5 |
| 2,652,925 | 9/1953 | Vermeiren | 210/1.5 |
| 3,693,792 | 9/1972 | Lang | 209/212 |
| 3,843,507 | 10/1974 | Kwan | 204/302 |
| 4,326,954 | 4/1982 | Shroyer | 210/222 |
| 4,407,719 | 10/1983 | Van Gorp | 210/695 |
| 4,865,747 | 9/1989 | Larson | 210/695 |
| 4,865,748 | 9/1989 | Morse | 210/739 |
| 4,879,045 | 11/1989 | Eggerichs | 210/695 |
| 4,892,655 | 1/1990 | Makovec | 210/222 |
| 5,074,998 | 12/1991 | De Baat Doelman | 210/97 |
| 5,171,431 | 12/1992 | Schultz | 210/94 |
| 5,200,071 | 4/1993 | Spiegel | 210/222 |

FOREIGN PATENT DOCUMENTS

| | | |
|---|---|---|
| 515346 | 5/1992 | European Pat. Off. . |
| 610142 | 4/1994 | European Pat. Off. . |
| 2250221 | 6/1992 | United Kingdom . |

OTHER PUBLICATIONS

Maggard, S. M., A Chemometric Analysis of a Magnetic Water Treatment Device, Doctoral Dissertation published by UMI, Ann Arbor, Michigan (1989). Abstract and pp. 177–192.

Kronenberg,K. J., Magnetic Water Treatment De–mystified, Magnets 6–15, 27 (Aug. 1987).

Turnbull, D., The Kinetics of Precipitation of Barium sulfate from Aqueous Solution, Acta Metallurgica, vol. 1, 684–691 (1953).

Turnbull, D., Kinetics of Heterogeneous Nucleation, The Journal of Chemical Physics, vol. 18, No. 2, 198–203 (1950).

Turnbull, D. et al., Rate of Nucleation in Condensed Systems, The Journal of Chemical Physics, vol. 17, No. 1, 71–73 (1949).

Herzog, R. E. et al., Magnetic Water Treatment: The Effect of Iron on Calcium Nucleation and Growth, Langmuir, 5, 861–867 (1989).

(List continued on next page.)

Primary Examiner—Kathryn L. Gorgos
Assistant Examiner—Alex Noguerola
Attorney, Agent, or Firm—Alfred Stapler, Esq.; Robert S. Lipton, Esq.; Lipton & Stapler

[57] ABSTRACT

A method for minimizing localized corrosion of fluid containers that occurs as a consequence of most non-chemical procedures for removing scale deposits is described. It counteracts the unavoidable side-effect of the lowering of the local pH in the vicinity of the bubbles of $CO_2$ that are generated during an electromagnetically-induced controlled precipitation procedure. The method is a simple and facile procedure for curbing the localized corrosion occurring as a result of most non-chemical procedures for removing scales. The method is desirably performed by an induction coil wrapped around a fluid container such as a pipe encrusted with scale through which hard water is flowing. A pulsing electrical current is successively applied through the coil and halted, preferably for 3 to 10 minutes each. When the current is applied, a transitory induced magnetic field is generated in the solution, and scale encrusted on the fluid container dissolves in the solution. When the pulsing current is stopped, the induced magnetic field in the solution ceases and so the scale stops dissolving, allowing a protective layer of scale to form over potential points of corrosion. Optionally permanent magnets may be used in the process, alone or with an induction coil.

13 Claims, 6 Drawing Sheets

OTHER PUBLICATIONS

Enomoto, N. et al., Effect of Ultrasonic Irradiation on Hydration of MgO Powder, 713–717 (1993).

Sultanov, Sh. Sh. et al., Effect of Sound ans Magnetic Fields on Sitall Formation in Lithium Aluminosilicate Glasses Synthesized in Radiant Heating Furnaces, Fizika i Khimiya Stekla, vol. 19, No. 1 161–168 (1991).

Hu et al., A Review of the Literature: Magnetic Water Treatment in Heat Transfer Applications, Johns Hopkins University Technical Report No. HMT-9101, 1–46.

Scaletek International, Sales Literature for Water Quality Management Systems, 8 Pages (1994).

The Mono–Tec Group, Inc., Magnetizers and Valence Electrons Bulletin 032492, 20 pages, Sales Literature.

WPDIS abstract of EP 610142 (Giles Thorval) Feb. 04, 1994.

WPIDS abstract of EP 515346 (Gerard Delforge) May 22, 1992.

The Principles of Magnetism, E. B. Moullin, Oxford–Clarendon Press, 1950, 62–65.

Magnetism:Principles and Applications, Derek Craik, John Wiley and Sons, 1995, 320–321.

Electrochemistry for Chemists, Sawyer et al., John Wiley and Sons, 1995, 11.

REDUCED CORROSION ELECTRONIC DESCALING TECHNOLOGY

FIELD OF THE INVENTION

This invention is an improvement in the field of electronic descaling wherein fluids in pipes or the like are treated by exposure to magnetic and electric fields.

1. Background of the Invention

Approximately 85% of the fresh water in the United States can be designated as hard water. Hard water contains calcium and other dissolved minerals, such as magnesium, which can and do accumulate on pipe interiors or heat transfer surfaces, forming hardened scale. This hardened scale clogs pipes and encrusts heat transfer surfaces. Scale build-up costs Americans billions of dollars each year, due to equipment failure or replacement costs. For example, heat loss typically accounts for 10% of the fuel cost of a newly installed residential or small commercial heater. At the end of its first year of operation, the cost due to heat loss typically increases to 15%; after five years, the cost due to heat loss mounts to 70% of the overall cost of fuel. Scale and lime deposits are responsible for this increase. To remove these scales, many companies resort to water or sand blasting, acid cleaning, and/or scraping. These procedures are costly and require significant downtime.

2. Definitions

The description of the present invention is facilitated by the use of the following terms which are used in this patent specification and the claims as defined herein:

A "fluid container" is a vessel that holds either running and/or standing fluids. Some examples of fluid containers are pipes, tanks, condensers, evaporators, boilers, cooling towers, chillers, and heat exchangers.

A "scale susceptible surface" is a surface of a fluid container that is in contact with the fluid and on which scale deposits form in the absence of an effective descaling process. Scale susceptible surfaces include the walls and bottom of fluid containers.

"Treating" a fluid container for scale deposits (1) prevents the formation of scale deposits or (2) removes existing scale deposits, or (3) both removes existing scale deposits and prevents the formation of scale deposits.

A "descaling process" can employ either one specific means for treating a fluid container for scale deposits or a plurality of means for treating a fluid container for scale deposits.

A "favored crystal structure" is a form of a precipitate that has a greater tendency to float in the solution it precipitated from, than to accumulate in deposits on scale susceptible surfaces.

A "disfavored crystal structure" is a form of a precipitate that has a greater tendency to accumulate in deposits on scale susceptible surfaces, than to float in the in the solution it precipitated from.

"Enablement of a descaling process" is to perform all the steps required for the descaling process to work. In the simplest instance it entails turning on the apparatus that performs the descaling process.

"Disenablement of a descaling process" is to counteract at least one step that is necessary for the descaling process to work. In the simplest instance it entails turning off the apparatus that performs the descaling process.

Turning the descaling apparatus "on and off" includes removing and/or repositioning the element that causes selective crystal formation by any chemical, mechanical or electrical means. The descaling apparatus is "disenabled" when it is off and "enabled" when it is on.

"Modifying" the effectiveness of the descaling process is to adjust the process of descaling so as to alter the equilibrium between the formation of the favored crystal structure and the disfavored crystal structure. Ways of modifying the effectiveness of the descaling process include attenuating the effectiveness of the descaling process treating means, and by turning the descaling process treating means on and off.

"Positively modifying" the effectiveness of the descaling process is modifying the effectiveness of the descaling process by adjusting the process of descaling so as to shift the equilibrium between the formation of the favored crystal structure and the disfavored crystal structure towards the formation of the favored crystal structure.

"Negatively modifying" the effectiveness of the descaling process is modifying the effectiveness of the descaling process by adjusting the process of descaling so as to shift the equilibrium between the formation of the favored crystal structure and the disfavored crystal structure towards the formation of the disfavored crystal structure.

SUMMARY OF THE INVENTION

The origin of most scale accumulation is the transformation of a super-saturated solution of hard water to the corresponding saturated solution. This transformation can be triggered by changes in pH, temperature, or pressure. Super-saturated mineral ions (such as calcium) will combine with counter-ions (such as bicarbonate ions) and then precipitate and deposit on scale susceptible surfaces. In such a super-saturated solution, scale accumulation becomes unavoidable, unless preventive measures are taken.

One means of counteracting the accumulation of scale deposits, due to the precipitation of the mineral carbonates, is to control the type of crystal structure formed. This procedure is termed controlled precipitation. Precipitates of calcium carbonate, for example, have two predominant crystal structures: one form of precipitate floats in solution and can be carried away with the fluid flow, whereas the other form clings to the side surfaces and/or sinks to the bottom and accumulates, causing the detrimental deposits. The key step in the controlled precipitation process is the formation of seed crystals upstream from the position of the scale accumulation sites. These seed crystals then, in effect, force all subsequent mineral carbonate precipitation to form around them, thereby allowing only the favored crystal structure to develop. In accordance with the present invention, specific equipment has been designed to perform controlled precipitation so as to induce the formation of the floating precipitous form of mineral carbonates in super-saturated solutions, and thereby prevent the detrimental accumulation of the disfavored crystal structure.

Another benefit of controlled precipitation is that tiny carbon dioxide ($CO_2$) gas bubbles are produced as a by-product of the chemical reaction. The $CO_2$ bubbles that are carried by the flow of the water stick to accumulated scale deposits due to surface tension. These $CO_2$ bubbles then chemically react with the calcium carbonate deposits, thereby solubilizing the precipitates and removing the scales from pipe walls and heat exchanger surfaces.

The controlled precipitation continues after the initial descaling is completed, and $CO_2$ bubbles continue to be produced. The amount of $CO_2$ bubbles in water is controlled by Henry's Law of partial pressures:

$$(CO_2)_{aq} = K\, P_{CO_2}$$

where $(CO2)_{aq}$ is the concentration of dissolved $CO_2$ in water, K is the equilibrium constant, and $P_{CO2}$ is the partial pressure of CO2 gas.

Since CO2 can combine with $H_2O$ to liberate a proton (and form a bicarbonate ion) the pH of the local area near a $CO_2$ bubble decreases significantly, i.e. becomes more acidic. For example, when the local pressure is 1.0016 atm (i.e., almost zero gauge pressure), the local pH near a $CO_2$ bubble is 3.82. For greater hydrostatic pressures often encountered in normal operation of heat exchangers and liquid transport systems, the pressure is much greater than 1.0016 atm. Thus, the pH value near $CO_2$ bubbles can be even more acidic than 3.8.

Corrosion takes place at pH values below 6.5, leading to the release of metals, such as zinc, copper and cadmium from pipes and plumbing fixtures. The lowering of the local pH in the immediate vicinity of $CO_2$ bubbles results in severe corrosion in fluid containers in that same immediate vicinity. Corrosion by a $CO_2$ bubble is a localized phenomenon, often resulting in localized pinholes in the fluid containers. Since most non-chemical fluid treatment technologies for preventing scale deposits are based on controlled precipitation, and therefore result in the formation of $CO_2$ bubbles, the corrosion of the local area surrounding these bubbles is a major problem throughout the fluid descaling field. These pockets of corrosion in the immediate area of $CO_2$ bubbles have heretofore been an unavoidable side-effect of most non-chemical descaling processes.

The present invention provides a new method for preventing the localized corrosion of fluid containers that heretofore has occurred as a consequence of most non-chemical procedures for removing scale deposits, i.e. procedures employing electromagnetic fields to control precipitation. The localized corrosion forms as an unavoidable side-effect of the lowering of the local pH in the vicinity of the bubbles of $CO_2$ generated during the controlled precipitation procedure. The present invention provides a method that successfully counteracts this side-effect and thereby prevents the localized corrosion.

A method for minimizing localized corrosion of fluid containers that occurs as a consequence of most non-chemical procedures for removing scale deposits is described. It counteracts the unavoidable side-effect of the lowering of the local pH in the vicinity of the bubbles of $CO_2$ that are generated during an electromagnetically-induced controlled precipitation procedure. The method is a simple and facile procedure for curbing the localized corrosion occurring as a result of most non-chemical procedures for removing scales. The method is desirably performed by an induction coil wrapped around a fluid container such as a pipe encrusted with scale through which hard water is flowing. A pulsing electrical current is successively applied through the coil and halted, preferably for 3 to 10 minutes each. When the current is applied, a transitory induced electric current is generated in the solution, and scale encrusted on the fluid container dissolves in the solution. When the pulsing current is stopped, the induced electric current in the solution ceases and so the scale stops dissolving, allowing a protective layer of scale to form over potential points of corrosion. Optionally permanent magnets may be used in the process, alone or with an induction coil.

The present invention prevents localized corrosion by providing a method for alternating the time for generating the favored crystal structure of the precipitating metal carbonate, with the time for allowing the disfavored crystal structure to form. The preventive aspect of this method may rely on a selective layering of scale on the potential sites of corrosion. When the disfavored crystal structure is allowed to form, scale layers develop at potential corrosion sites much more rapidly than at other areas and therefore, form preferentially to cover and protect sites most likely to corrode first.

One theory that may account for the success of the procedure of the present invention is based on consideration of the exothermic nature of the process of scale dissolution and the inverse temperature effect of the solubility of $CaCO_3$. Thus, along with the creation of the potential corrosion sites due to the local decrease in pH in the vicinity of the bubbles of $CO_2$ that are generated during the controlled precipitation procedure described above, comes a concomitant increase in the local temperature caused by the liberation of heat as the scale dissolves. This elevation in temperature accelerates new local scale deposits. By controlling the time periods that the two alternative crystal forms are produced, the scale susceptible surfaces can be effectively descaled, while the potential corrosion sites can be protected with new scale. In effect, the process of the present invention helps "heal" the wounds, corrosion points in the corrosion susceptible surface, by selectively forming "scabs" of scale.

If a descaling apparatus is not used in a hard water or similar environment, the prevalent type of metal carbonate precipitate is in the form of the disfavored crystal structure. On the other hand, when a supplementary descaling apparatus is working properly, the prevalent type of metal carbonate precipitate is in the form of the favored crystal structure. The present invention is to provide means for modifying the effectiveness of descaling apparatus over alternating time periods, so as to adjust the equilibrium between the formation of the two predominant forms of the metal carbonate. This procedure optimizes the combined effect of the two counter-acting processes.

The invention is desirably performed by turning on and off the descaling apparatus in a controlled fashion, so as to optimize the combined effect of the two counter-acting processes: removing detrimental scale from the scale susceptible surfaces, and providing a protective scale layer over potential corrosion points.

This aspect of the invention will work with any descaling apparatus that can be turned on and off, such as those that use an induction coil. It would also work with descaling apparatus, such as those that employ permanent magnets, where the de-scaling effect may temporarily be sufficiently attenuated so that equilibrium between the formation of the two predominant forms of the metal carbonate can be appropriately adjusted.

The time interval for positively modifying the descaling process can be from about 30 seconds to about 2 hours, more preferably about 1 minute to about 1 hour, even more preferably about 2 minutes to about 30 minutes, and most preferably about 3 minutes to about 10 minutes. Similarly the time interval for negatively modifying the descaling process can be from about 30 seconds to about 2 hours, more preferably about i minute to about I hour, even more preferably about 2 minutes to about 30 minutes, and most preferably about 3 minutes to about 10 minutes.

In a preferred embodiment, positively and negatively modifying the descaling process is performed in a continual, alternating manner. The most preferred embodiment of this aspect of the invention uses equal time intervals for positively modifying and negatively modifying the descaling process.

One aspect of this invention employs an induced current to help catalyze the preferential formation of the favored crystal structure precipitate in a supersaturated solution. One embodiment of this aspect of the invention employs an induction coil wrapped around the fluid container. When the source of electrical current to the induction coil is pulsed in opposite directions, the direction of the electrical current flowing through the coil is reversed with each pulse. The electric current has a corresponding magnetic field perpendicular to it; the magnetic field forms and then collapses with every change of direction of the electric field.

Each time the magnetic field forms and collapses, a transitory current is induced within the fluid in the fluid container wrapped by the coil. This induced current helps to catalyze the preferential formation of the favored crystal structure precipitate in a supersaturated solution. When the flow of current through the coil is halted in accordance with the present invention, the induced current ceases and the catalysis stops. This allows the disfavored crystal structure to preferentially form, providing a protective layer of scale over potential corrosion points.

Another embodiment of this aspect of the invention employs a rotating permanent magnet (or a plurality of them) to help catalyze the preferential formation of the favored crystal structure precipitate in a fluid container holding a supersaturated solution. The permanent magnet is mounted and driven so that it rotates with respect to the fluid container. The permanent magnet is rotated so as to successively form and then collapse a magnetic field in the solution, thereby inducing a series transitory electrical currents within the solution. As described above, an induced current helps to catalyze the preferential formation of the favored crystal structure precipitate in a supersaturated solution. Halting the rotation of the magnet, causes the induced current to cease. This allows the disfavored crystal structure to preferentially form, providing a protective scale layer over potential corrosion points.

An alternative aspect of this invention works through a static, or stationary, magnetic field acting upon a flowing fluid. For this aspect of the invention, the product of the flow velocity, the strength of the magnetic field and the exposure time should equal at least 300 Tesla.meter for the apparatus to be enabled. A preferred embodiment of this type employs a plurality of magnets.

In one embodiment of this aspect of the invention, two magnets are electronically engaged and disengaged from opposite sides of a fluid container at regular intervals. In a second embodiment, the magnets are mechanically removed at regular intervals. In preferred embodiments, the magnets are engaged and disengaged at a narrow section of the fluid container, such as a feed-line. In the most preferred embodiment the magnets are permanent magnets rather than electromagnets.

In a third embodiment the magnets are not disengaged, but the fluid flow is significantly decreased at regular intervals so as to cause the product of the velocity of the fluid, the strength of the magnetic field and the exposure time to drop below 300 Tesla.meter.

Yet, another aspect of this invention controls the descaling process through the use of a combination of one or more stationary permanent magnetic fields with a means for creating an induced current in the fluid. Embodiments of this aspect of the invention include those that work by modifying the effectiveness of the descaling process: (a) through adjustment of the induced current alone; (b) through adjustment of the stationary magnetic field(s) alone; and (c) through adjusting both the induced current and the stationary magnetic field.

DESCRIPTION OF PREFERRED EMBODIMENTS

Figure 1:
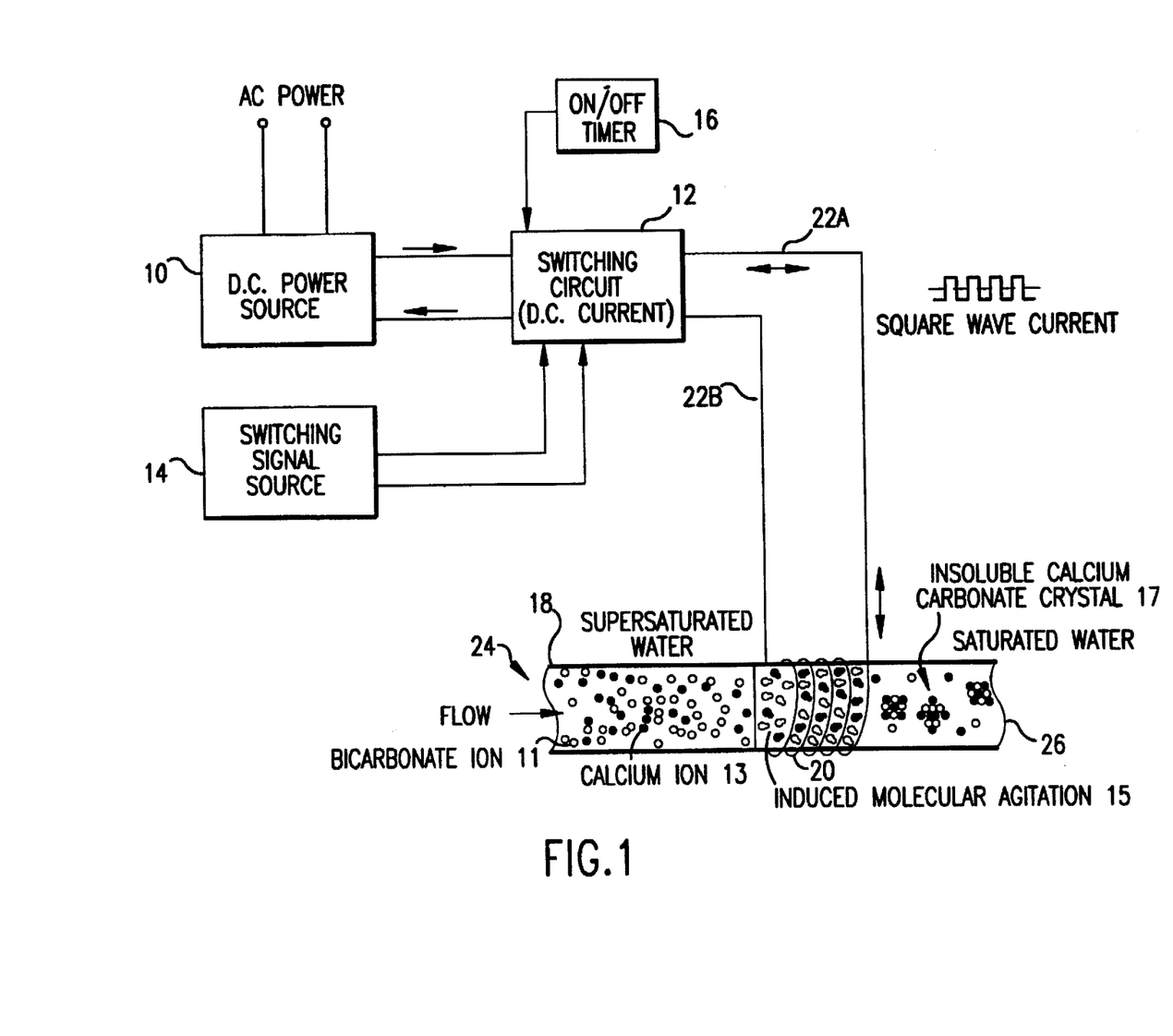
FIG. 1 is a block diagram of a driver for an electronic descaling apparatus embodying the present invention.

The present invention can be accomplished using an electronic descaling system as shown in FIG. 1. The actual electronic de-scaling process uses a descaling coil or solenoid 20 positioned around a pipe 18. The power to the coil 20 is supplied by a current source 10, a switching circuit 12 and a signal switching source 14. In addition, an on/off timer circuit 16 cycles the supply of power to the coil 20 descaling system.

In operation, AC power is applied to D.C. power source 10, which provides a D.C. current output to the switching circuit 12. The switching circuit 12, responsive to control signals from the switching signal source 14, provides output D.C. current in a first direction through the coil 20, or output D.C. current in a second, opposite direction through coil 20.

The switched D.C. power in conductors 22A and 22B, induces switched magnetic and electric fields generated by coil 20 within the fluids flowing inside the pipe 18 to effectuate descaling of dissolved mineral ions. For example, the induced molecular agitation in the region 15 causes the input flow 24 of supersaturated water containing bicarbonate ions 11 and calcium ions 13 to be converted to an output flow 26 of saturated water containing insoluble calcium carbonate crystals 17.

Figure 3:
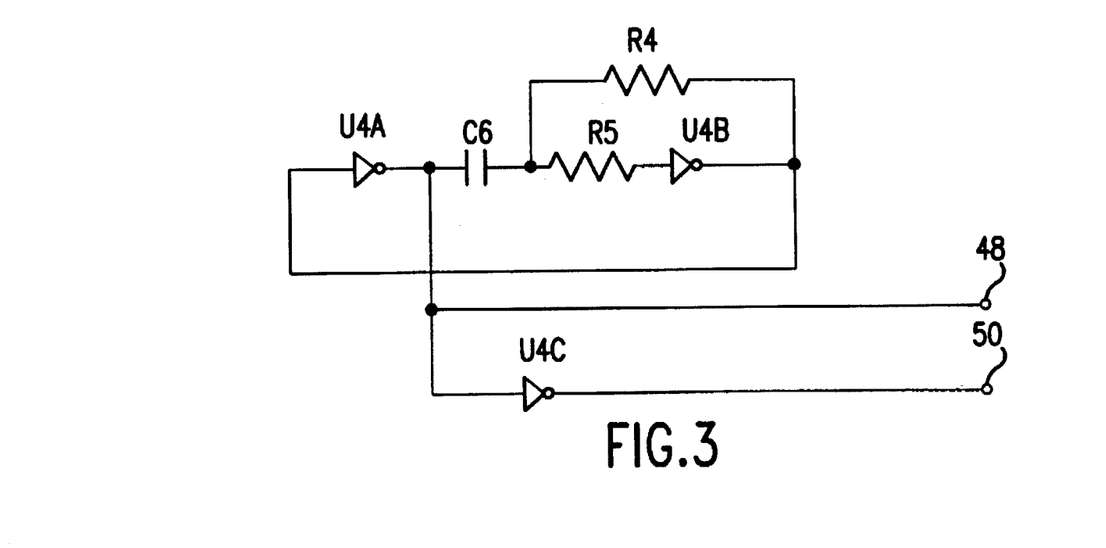
FIG. 3 is a circuit diagram, partially in block form, of a switching signal source 14 of FIG. 1, in accordance with the present invention.
Figure 4:
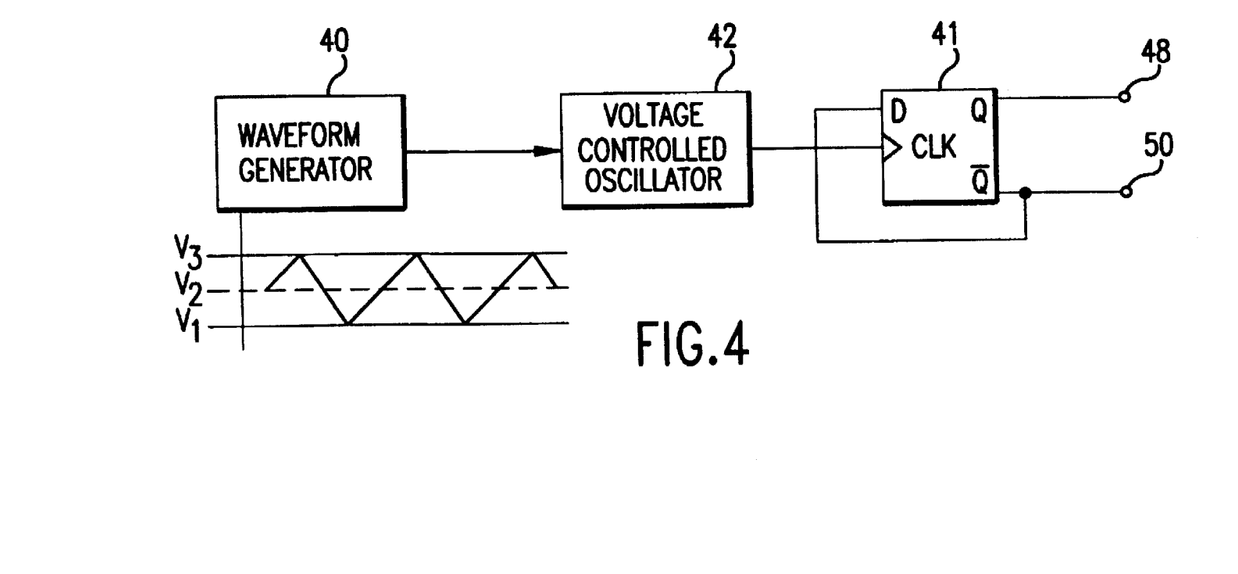
FIG. 4 is a circuit diagram, partially in block form, of an alternate embodiment of a switching signal source 14 of FIG. 1, in accordance with the present invention.

As indicated from FIG. 1, the current is switched in a switching circuit responsive to a switching signal source. FIGS. 3 and 4 represent alternate embodiments of a switching signal source. In FIG. 3, the switching signal frequency is constant, while in FIG. 4, the switching frequency is variable.

Figure 2:
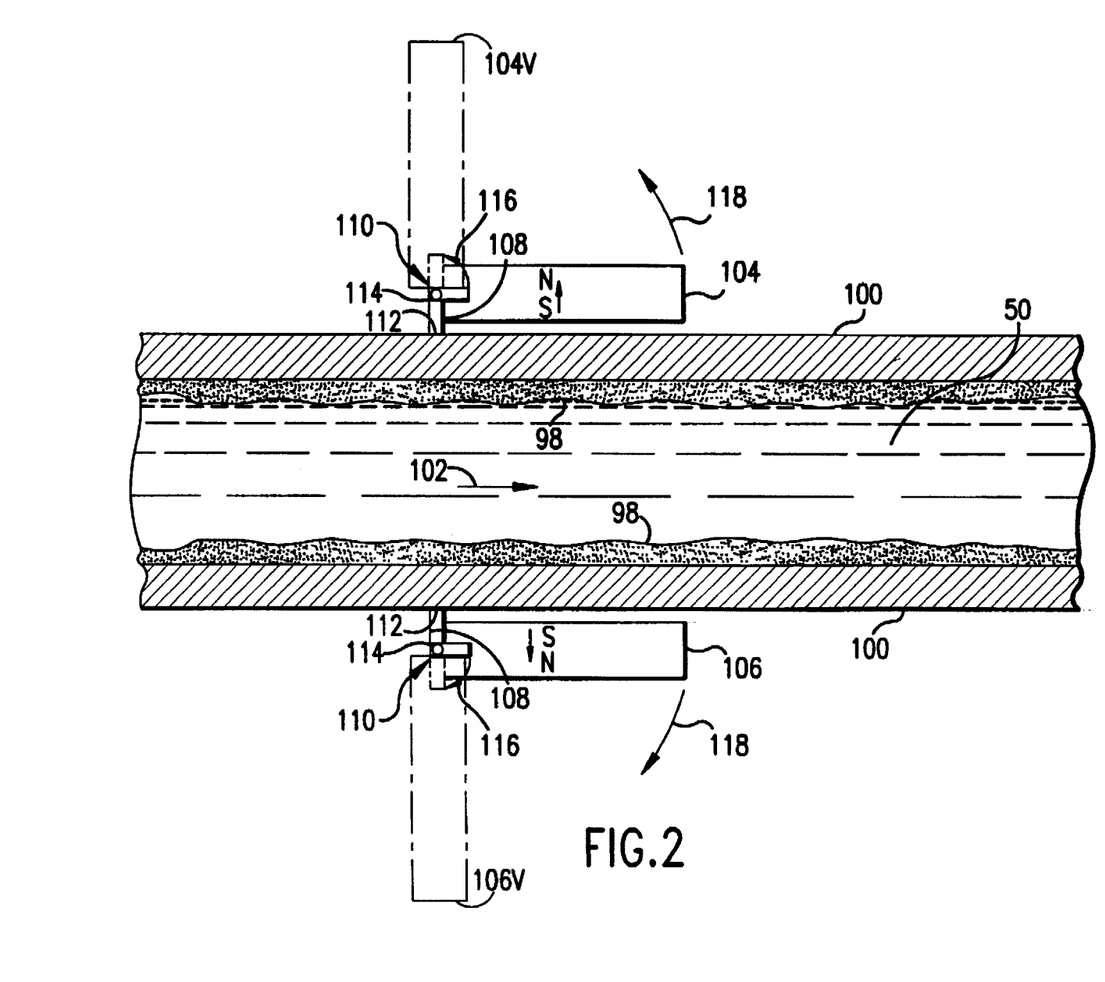
FIG. 2 is a vertical cross-sectional view of an embodiment of apparatus for performing the present invention using movable permanent magnets.

FIG. 2 depicts an alternative apparatus for performing a process in accordance with the present invention. It shows means for preventing localized corrosion in a pipe 100, while treating the pipe 100 to minimize scale deposits 98 with a descaling process that relies on a stationary magnetic field to act upon a fluid 50 flowing through the pipe 100. An arrow 102 depicts the flow of the fluid 50. Two permanent bar magnets 104 and 106 are positioned. Magnet 104 is above and magnet 106 is below the pipe 100. Each bar magnet 104, 106 is mounted at magnet joint 110 to a flexible L-joint 108. Each L-joint 110 is also connected to the pipe 100 at a pipe joint 112. The flexible L-joint is adapted to be pivoted ninety degrees about the axis of each pivot point 114. A motor or pneumatic driver (not shown) is connected to the pivot point 114 by an axle extending therefrom for reciprocating the magnets 104, 106 between the illustrated horizontal position and the vertical position 104V, 106V (shown by dashed lines). Arrows 118 indicate the direction of travel of the magnets 104, 106 from the horizontal to the vertical positions.

When each L-joint 108 is in a right-angled position, thereby positioning the two bar magnets 104, 106 in horizontal positions above and below the pipe respectively, the descaling process is enabled. As illustrated, the magnets are configured so that the bar magnet 104 above the pipe 100 has its south pole S directed downward towards the pipe 100, whereas the bar magnet 106 below the pipe 100 has its south pole S directed upward towards the pipe. A magnetic field is thereby produced between the two permanent bar magnets 104, 106. The flow 102 of the fluid 50 in the pipe 100 through this magnetic field produces a force, described above, that results in enablement of the descaling process.

When L-joints 108 are rotated in the directions depicted by arrows 116, so that they become erect, the bar magnets are rotated ninety degrees from their horizontal "enabled" positions, thereby dissipating the magnetic field between the two magnets 104, 106. This dissipation of the magnetic field causes the descaling process to be disenabled. In operation, the pivots 114 are mechanically driven to rotate the magnets 104, 106 successively up and down for desired time periods.

Turning to FIG. 3, which describes further detail of the embodiment shown in FIG. 1, inverters U4A and U4B are connected in an oscillator feedback arrangement with resistors R4, R5 and capacitor C6. The time period of oscillation is a function of the values of the capacitor and the resistors. The selection of resistor R4 provides a means of adjustment of the period of oscillation, which is set to be 500 Hz. A 500 Hz square wave output is provided at node 48 at the output of inverter U4A. The logical complement of the output at node 48 is provided at node 50 at the output of inverter U4C.

An alternate switching signal source which provides a sweep frequency square wave as the switching signal source to nodes 48 and 50, is shown in FIG. 4. A waveform generator 40 provides a triangular wave between 1 and 3 volts to a voltage controlled oscillator 42. The output of VCO 42 is a periodic waveform which linearly sweeps back and forth between 1 KHz and 3 KHz which is output to the clock input of flip flop 41. Flip flop 41 divides the 1-3 KHz input to provide a 0.5 to 1.5 KHz output at the Q output thereof to node 48 and the complement of that signal at the Q NOT output to node 50.

Figure 5:
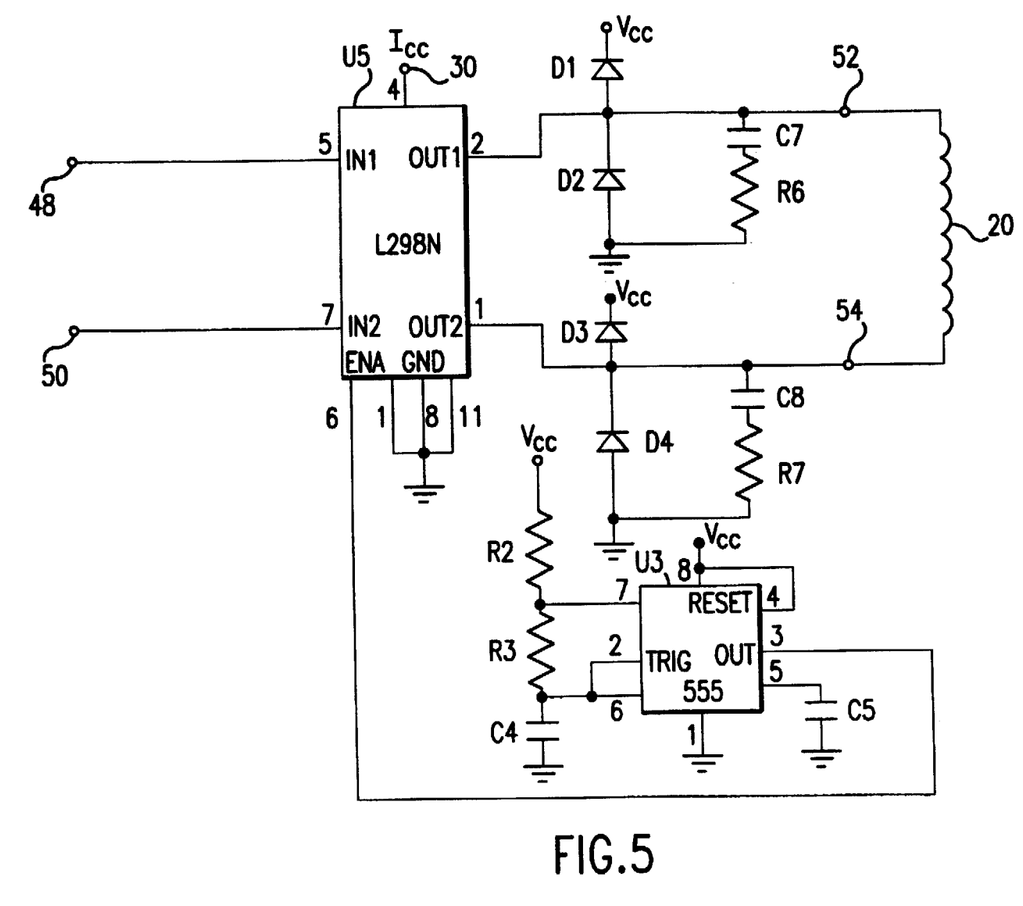
FIG. 5 is a schematic diagram of a switching circuit 12 and a schematic diagram of an on/off timer 16 of FIG. 1, in accordance with the present invention.

The D.C. output at node 30 and the switching signal source at nodes 48 and 50 are used in the switching circuit of FIG. 5 to drive coil 20. In particular, a full wave rectifier in the form of an power bridge circuit U5, provides two input controls, IN1 and IN2. When the input to IN1 is at a first logic level and the input to IN2 is at the opposite logic level, Icc at terminal 30 is connected to conduct current to output terminal OUT1, while at the same time output terminal OUT2 is connected to conduct current from output terminal OUT2 to ground. When the input to IN1 is at a second logic level and the input to IN2 is at the opposite logic level, i.e. the first logic level, Icc at terminal 30 is connected to conduct current to output terminal OUT2, while at the same time output terminal OUT1 is connected to conduct current from output terminal OUT1 to ground.

One terminal of coil 20 is coupled to terminal 52 and to OUT1 of U5, while the other terminal of coil 20 is coupled to terminal 54 and to OUT2 of U5. Diodes D1, D2, D3 and D4 are current steering diodes which keep nodes 52 and 54 respectively, clamped between Vcc and ground, when the current coil 20 is being switched. That is, if the voltage at terminal 52 attempts to go above Vcc, diode D1 conducts to keep terminal 52 clamped at Vcc. If the voltage at terminal 52 attempts to go below ground level, diode D2 conducts to keep terminal 52 clamped at ground level. Similarly, if the voltage at terminal 54 attempts to go above Vcc, diode D3 conducts to keep terminal 54 clamped at Vcc. If the voltage at terminal 54 attempts to go below ground level, diode D4 conducts to keep terminal 54 clamped at ground level. In addition, a high pass filter consisting of a series connected capacitor, C7 and resistor R6 ground provide noise suppression at terminal 52. A similar high pass filter consisting of a series connected capacitor, C8 and resistor R7 also provide similar noise suppression at terminal 54.

An on/off timer circuit is provided to the enable ENA input of U5 to cycle the D.C. output current to coil 20 on and off. A typical cycle time is 5 minutes on and 5 minutes off. The on/off timer circuit consists of resistors R2, R3, capacitors C4, C4 and a 555 integrated circuit timer chip U3. Resistors R2, R3 and capacitor C4 are chosen to provide a cyclical on/off timer period of 5 minutes on and 5 minutes off. The output time period and duty cycle is given by:

T(total time period)=0.693 (R2+2R3)C4

D(duty cycle)=R3/(R2+2R3)

In operation, the output of timer chip U3 at the ENA enable input of U5 provides switched D.C. constant current to coil 20 for 5 minutes. After 5 minutes of descaling operation, the output of timer chip U3 at the ENA enable input of U5 shuts off the switched D.C. constant current to coil 20 for 5 minutes. Thus, for 5 minutes coil 20 has no current flow, and thereafter, the process of 5 minutes on and 5 minutes off repeats.

In practice, Resistors R2, R3 and capacitor C4 can be chosen to provide a cyclical on/off timer period of 30 seconds to an hour on and 30 seconds to an hour off. The on time and off time need not be identical.

In operation, the constant current D.C. input at node 30 is switched in alternating directions through coil 20. First, when the control signal at node 48 is at a first logic level and the control signal at node 50 is at a second logic level, Icc at terminal 30 is connected to conduct current to output terminal OUT1, providing a current flow in coil 20 from terminal 52 to terminal 54 and through terminal OUT2 of U5 to ground. Then, when the control signal at node 50 is at a first logic level and the control signal at node 48 is at a second logic level, Icc at terminal 30 is connected to conduct current to output terminal OUT2, providing a current flow in coil 20 from terminal 54 to terminal 52 and through terminal OUT1 of U5 to ground. As the control signals at nodes 48 and 50 reverse polarity, the current in coil 20 is switched from one direction to the opposite direction.

| Specifications | | |
|---|---|---|
| Input voltage | 12 volts DC +/−10% | |
| Input current | 200 mA source | |
| Oscillator: | | |
| Nominal frequency | 500 Hz | |
| Frequency range | 400 Hz–600 Hz | |
| Function | Square wave | |
| Timing enable: | | |
| Nominal range | 5 minutes on/5 minutes off | |
| Range | 3–10 minute intervals | |
| Output drive | | |
| Load | Maximum 1 ohm impedance | |
| Constant current | 70 mA | |
| Active component designations | | |
| U1 | LM317 | National Semiconductor LM317AT |
| U2 | LM7805 | Panasonic AM7805 |
| U3 | LM555 | National Semiconductor LM555CN |
| U4 | HC4049 | National Semiconductor MM74HC4049N |
| U5 | L298 | SGS-Thomson L298N |

Figure 6:
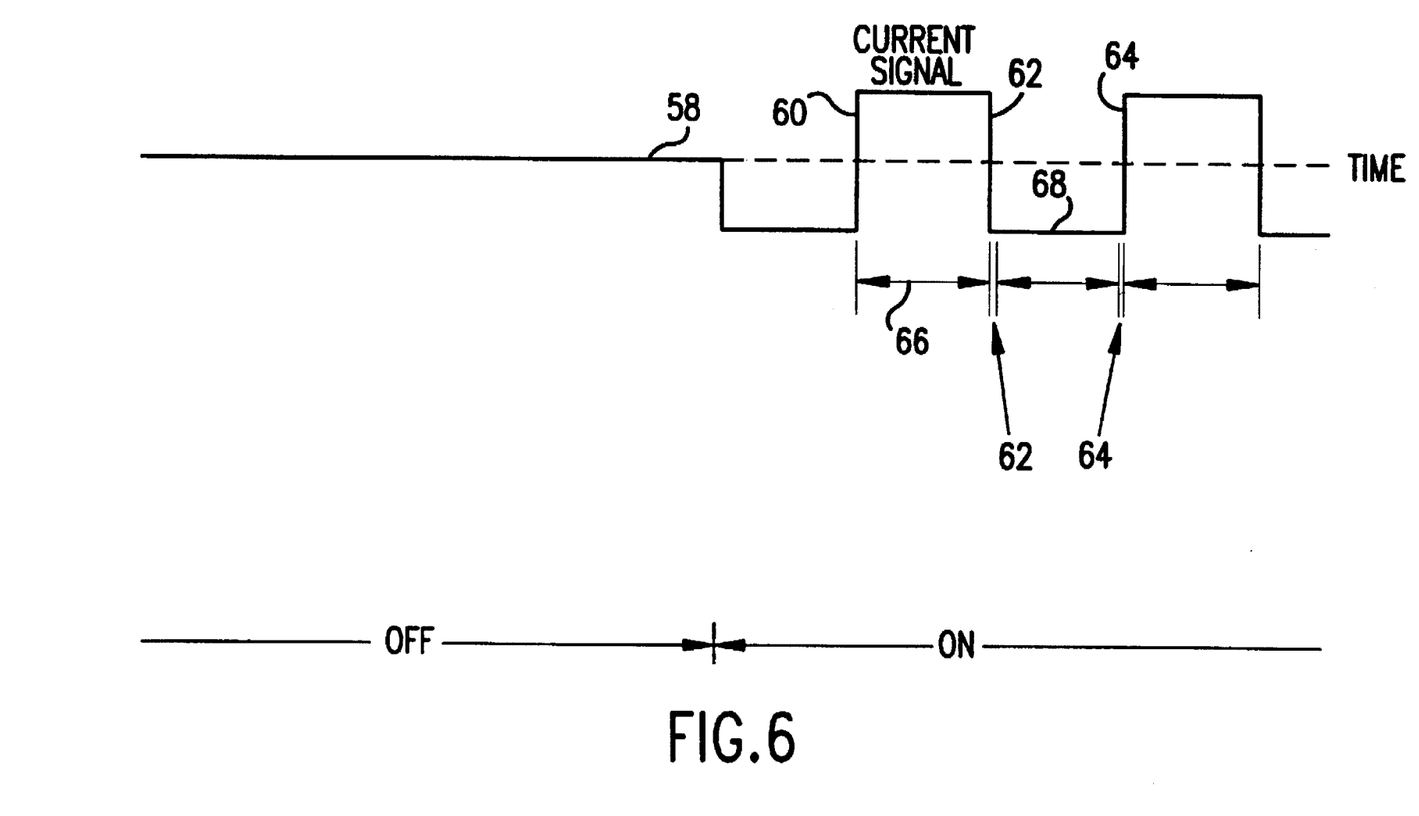
FIG. 6 is a waveform of the current in a descaling coil, in accordance with the present invention.

FIG. 6 shows the current waveform, a switched D.C. current waveform 60 provided to coil 20. As indicated in FIG. 6, while the coil current is in steady state (not changing), there is a constant D.C. current provided through the coil. That is, during the steady state current 66 in one direction, or steady state current 68 in the opposite direction, the D.C. supply determines the current level. In the steady state, the magnetic field of the coil is constant. However, during the transition 62 between D.C. current in first direction to the second direction the coil provides a changing magnetic field for inducing electromotive forces in the fluid within the pipe. Similarly, during the transition 64 between D.C. current in the second direction, to D.C. current in the first direction a changing magnetic field is generated.

It is noted that due to the use of an on/off timer in the power supply of the present invention, the current to the coil 20 and the descaling effect is turned on and off. (See section 58 of the waveform in FIG. 6.) As a result of turning the descaling apparatus on and off in a controlled fashion, an equilibrium of the combined effect of two counter-acting processes of removing detrimental scale from the scale susceptible surfaces, and providing a protective scale layer over potential corrosion points is achieved.

Figure 7:
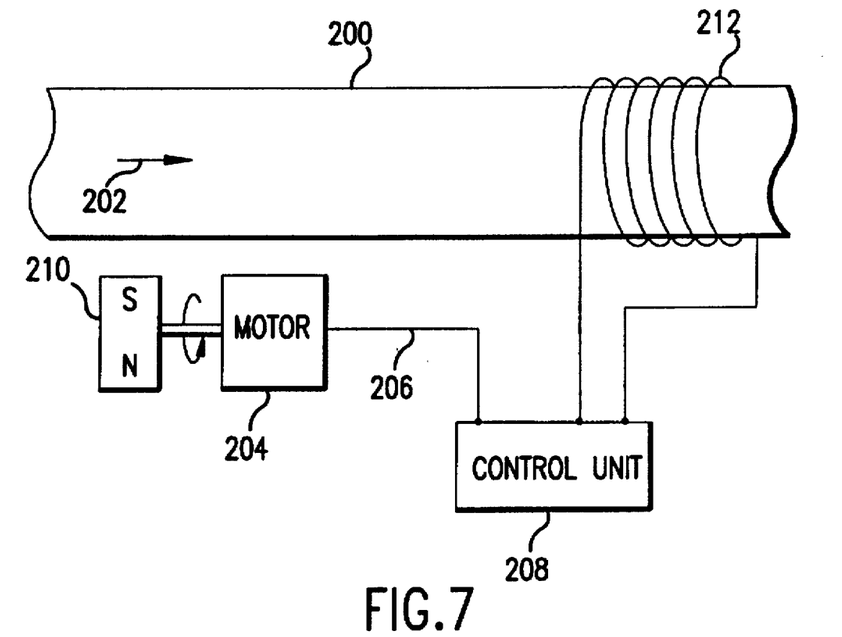
FIG. 7 is a view showing apparatus of the present invention which includes a permanent magnet and an induction coil.

FIG. 7 shows an apparatus of the present invention that controls the descaling process through the use of a combination of one or more stationary permanent magnetic fields with a means for creating an induced current in the fluid. Arrow 202 shows the direction of fluid flow through a pipe 200. A motor 204 controlled through line 206 by a control unit 208 causes a permanent magnet 210 to rotate in the vicinity of the pipe 200 and thereby successively create and destroy a magnetic field in the fluid flowing through it. Also connected to the control unit 208 is a solenoid 212 wrapped around the pipe 200. In accordance with the present invention, the control unit may be operated to (a) adjust the current through the solenoid 212; (b) adjust the stationary magnetic field by stopping and starting the rotation of the magnet 210; or (c) adjust both the current through the solenoid (and thus the transitory induced current in the fluid in pipe 200) and the stationary magnetic field by controlling movement of the magnet 210.

Figure 8:
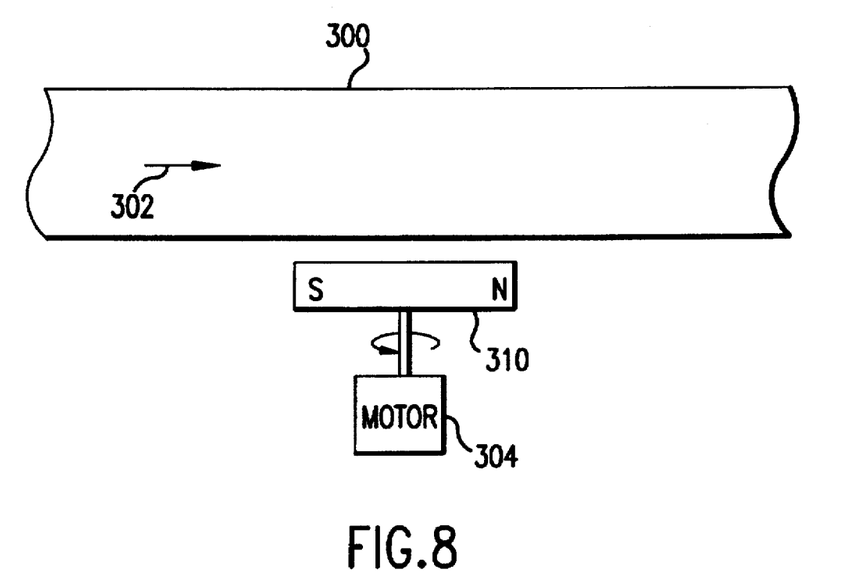
FIG. 8 is a view showing apparatus of the present invention using a permanent magnet.

FIG. 8 shows a pipe 300 where the direction of flow is shown by the arrow 302 and a motor rotates a permanent magnet 310. A control unit 308 (not shown) successively turns the motor on to rotate or reciprocate the the magnet 310, thereby enabling the descaling process and then turns the motor off, to disenable the descaling process.

EXAMPLE

The implementation of the present invention is illustrated by the following example. A coil with 22 turns is wrapped around a ten-inch diameter pipe that transports hard water. The coil is connected in an electrical circuit to a power source producing an output current of 1 ampere. The power source switches the direction of the current with a frequency of 1000 per second. The wave form of the current passing through the coil is a square wave. An on/off switch that is capable of turning the power source on and off is included in the circuit.

When the switch is turned on, current from the power source runs through the coil, generating a magnetic field perpendicular to the flow of electrons. Each time the direction of the current is changed, the magnetic field dissipates, which generates an transitory electrical current in the hard water flowing through the pipe. As discussed above, this leads to the generation of carbon dioxide bubbles that helps to remove scale material from the pipe, but also produce localized corrosion. By alternating the time the current is on with the time the current is off, by switching the on/off switch every five minutes, the amount of localized corrosion is substantially prevented while at the same time the removal of scale in the pipe is relatively unaffected.

We claim:

1. A process of transporting hard water through a vessel which has a first portion on whose inner surface scale is deposited due to adhesion of the materials which make the water hard, said process including the steps of producing through magnetic induction, in a second portion of the vessel located upstream from the first portion, molecular agitation of said materials and formation of bubbles of $CO_2$ and local areas of low pH in the immediate vicinity of said $CO_2$ bubbles which then remove said deposited scale from those locations in said first vessel portion which are contacted by said bubbles and local areas of low pH, repeatedly turning on and off said producing of molecular agitation of said materials, where said formation of bubbles and local areas of low pH ceases and scale is redeposited during each said turning off, in locations in said first vessel portion from which scale had been removed by having been contacted by said bubbles and local areas of low pH during each said turning on.

2. The process of claim 1 wherein said producing of molecular agitation is produced by an electronic descaling process; and said repeated turning on and off is produced by repeatedly turning on and off said electronic descaling process.

3. The process of claim 2 wherein each turning on is for a period of about 30 seconds to about 2 hours, and each turning off is also for a period of about 30 seconds to about 2 hours.

4. The process of claim 2 wherein each turning on is for a period about equal to the period for each turning off.

5. The process of claim 4 wherein each turning on and each turning off is for a period of about 5 minutes.

6. The process of claim 2 wherein each turning on and each turning off is for a period of about 3 minutes to about 10 minutes.

7. The process of claim 2 wherein the electronic descaling process includes creating a time-varying magnetic field in the water within said second vessel portion.

8. The process of claim 7 wherein the time-varying magnetic field is created by an induction coil wrapped around said second vessel portion.

9. The process of claim 1 wherein each turning on and each turning off is for a period sufficient to produce equilibrium between said scale removal and said scale re-deposition.

10. The process of claim 1 wherein each turning on comprises engaging permanent magnets with the outside of said first vessel portion and each turning off comprises disengaging said permanent magnets from said vessel.

11. The process of claim 1 wherein said first vessel portion is heated.

12. The process of claim 1 wherein the hard water includes calcium carbonate.

13. The process of claim 1 wherein each turning on comprises rotating at least one permanent magnet adjacent to said second portion of said vessel.

* * * * *